United States Patent
Bai et al.

(10) Patent No.: US 10,533,122 B1
(45) Date of Patent: Jan. 14, 2020

(54) STRONG PLUGGING DRILLING FLUID COMPOSITION AND PREPARATION METHOD THEREOF, AND USE THEREOF

(71) Applicant: Southwest Petroleum University, Chengdu, Sichuan Province (CN)

(72) Inventors: Yang Bai, Chengdu (CN); Cheng Li, Chengdu (CN); Guojun Li, Chengdu (CN); Yan Cheng, Chengdu (CN); Hao Zhang, Chengdu (CN); Guancheng Jiang, Beijing (CN); Jinsheng Sun, Shandong (CN); Jingping Liu, Shandong (CN)

(73) Assignee: Southwest Petroleum University, Chengdu, Sichuan Province (CN)

( * ) Notice: Subject to any disclaimer, the term of this patent is extended or adjusted under 35 U.S.C. 154(b) by 0 days.

(21) Appl. No.: 16/523,228

(22) Filed: Jul. 26, 2019

(30) Foreign Application Priority Data

May 20, 2019 (CN) .......................... 2019 1 0418798

(51) Int. Cl.
 *C09K 8/42* (2006.01)
 *C09K 8/24* (2006.01)
 *C09K 8/16* (2006.01)

(52) U.S. Cl.
 CPC ................ *C09K 8/426* (2013.01); *C09K 8/16* (2013.01); *C09K 8/24* (2013.01); *C09K 2208/10* (2013.01)

(58) Field of Classification Search
 CPC ....... C09K 8/426; C09K 8/16; C09K 2208/10
 See application file for complete search history.

(56) References Cited

U.S. PATENT DOCUMENTS

| 8,183,181 | B1* | 5/2012 | Gupta | C09K 8/68 507/120 |
| 9,771,509 | B1* | 9/2017 | Lv | C09K 8/03 |
| 2005/0187113 | A1* | 8/2005 | Hayes | C09K 8/03 507/119 |
| 2006/0091834 | A1* | 5/2006 | Alipour | B66C 1/10 318/139 |
| 2014/0231145 | A1* | 8/2014 | Kverel | C09K 8/032 175/65 |
| 2018/0208824 | A1* | 7/2018 | Lv | C09K 8/24 |

FOREIGN PATENT DOCUMENTS

| CN | 104610945 A | 5/2015 |
| CN | 104962251 A | 10/2015 |
| CN | 105647493 A | 6/2016 |
| CN | 107556990 A | 1/2018 |

* cited by examiner

*Primary Examiner* — Silvana C Runyan
(74) *Attorney, Agent, or Firm* — Duane Morris LLP

(57) ABSTRACT

The invention relates to the field of drilling fluid, and discloses a strong plugging drilling fluid composition and preparation method thereof, and use thereof. The strong plugging drilling fluid composition comprises water, bentonite, $Na_2CO_3$, a shale inhibitor, a filtrate reducer, a viscosity reducer, an anti-collapse agent, a nanometer plugging agent, a lubricant and a weighting agent. The shale inhibitor is modified asphalt, the anti-collapse agent is ultra-fine calcium carbonate, and the nanometer plugging agent is polyethylene glycol surface-modified nano-graphene.

16 Claims, No Drawings

STRONG PLUGGING DRILLING FLUID COMPOSITION AND PREPARATION METHOD THEREOF, AND USE THEREOF

PRIORITY CLAIM & CROSS REFERENCE

The application claims priority to Chinese Application No. 201910418798.4, field on May 20, 2019, entitled "strong plugging drilling fluid composition and preparation method thereof, and use thereof", which is specifically and entirely incorporated herein by reference.

FIELD OF THE INVENTION

The invention relates to the technical field of drilling fluid, and particularly relates to a strong plugging drilling fluid composition and preparation method thereof, and use thereof.

BACKGROUND

The shale stratum is a hard and brittle stratum with developed micro-pores and high water sensitivity. The shale stratum is extremely subject to the wellbore instability accidents such as well collapse and borehole shrinkage during a process of drilling deep layer large displacement horizontal wells and cluster horizontal wells. Although the oil-based drilling fluid is conducive to maintain stability of well wall and protect the reservoir layer to a maximum extent, thus it is widely used in shale gas horizontal well drilling operation; however, the oil-based drilling fluid causes serious contamination of drill cuttings, which is difficult and costly to be treated. In addition, the supported technologies with respect to construction tools and plugging materials are still immature, which severely limits its large-scale application. The water-based drilling fluid in use has insufficient plugging capacity for heterogeneous micrometer/nanometer pores and cracks in the shale stratum, thus it is difficult to meet the construction requirements on safety and efficiency of the well drilling.

The existing plugging materials have a large particle size and their shape do not match with the cracks, it is difficult to enter into the micrometer/nanometer pores and cracks of the shale stratum, thus the plugging effect is poor.

SUMMARY

To overcome the defects in the prior art, namely the collapse and instability of borehole wall during a process of drilling the shale deep well large displacement horizontal segment with a water-based drilling fluid, and the effect is undesirable to block off the shale micrometer/nanometer cracks with the existing plugging materials. The existing plugging material has a large particle size and their shape do not match with the cracks, thus it is difficult to enter into the micrometer/nanometer cracks of the shale stratum. In addition, the conventional plugging materials are extremely prone to cause an agglomeration, which results in an increased particle size and affects the overall performance of the drilling fluid. In view of the defects, in accordance with some embodiments, the present disclosure provides a strong plugging drilling fluid composition and preparation method thereof, and use thereof, wherein the strong plugging drilling fluid composition may effectively block micrometer/nanometer cracks in deep well large displacement horizontal segment shale stratum, interdict the drilling fluid in liquid phase to enter the cracks, and form a long-lasting and dense blocking barrier at the adjacent borehole wall, thereby prevent a transmission of the pressure in pores and cracks, reduce the hydraulic fracture effect, prevent the blocks from falling off, effectively avoid collapse of the stratum and maintain stability of the stratum.

To attain the above object, in a first aspect, the present disclosure provides a strong plugging drilling fluid composition. In accordance with some embodiments, the strong plugging drilling fluid composition comprises water, bentonite, $Na_2CO_3$, a shale inhibitor, a filtrate reducer, a viscosity reducer, an anti-collapse agent, a nanometer plugging agent, a lubricant and a weighting agent. in some embodiments, the shale inhibitor is modified asphalt, the anti-collapse agent is ultra-fine calcium carbonate, and the nanometer plugging agent is polyethylene glycol surface-modified nano-graphene.

In a second aspect, the present disclosure provides a method for preparing the aforementioned drilling fluid composition, comprising:
(S1) performing pre-hydration treatment of the bentonite;
(S2) mixing the bentonite obtained following the pre-hydration treatment in step (S1) with the shale inhibitor, the filtrate reducer, the viscosity reducer, the anti-collapse agent, the nanometer plugging agent, the lubricant and the weighting agent sequentially.

In a third aspect, the present disclosure provides a use of method for simulating the plugging of deep well large displacement horizontal segment shale stratum, wherein the aforementioned drilling fluid composition or a drilling fluid composition prepared with the aforementioned preparation method in drilling a deep well large displacement horizontal segment shale stratum.

With the above technical scheme, the surface modification of the nano-graphene particles is performed by using the polyethylene glycol for preparing a nanometer plugging agent with strong plugging property, thereby obtain the strong water stability and prevent agglomeration between the nanoparticles. When the drilling process encounters the micrometer/nanometer cracks in the shale stratum, the modified asphalt with larger particle size initially constructs bridges, reduces the size of the cracks, then the micron-sized ultra-fine calcium carbonate with smaller particle diameter fills to reduce the size of the shale cracks till the blocking process is finished by using the last stage of nanometer plugging agent, thereby effectively plug a variety of micrometer/nanometer pores and cracks of the well wall. The different anti-collapse agents and treatment agents can form a "force chain network" at the micro-scale contact interface through reasonable compounding and particle diameter grading, such that the particles are squeezed and tightly coupled with each other, thereby improve the sealing capability of the strong plugging drilling fluid composition and reduce the possibility of collapse and falling of the blocks during the drilling process.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The nanometer materials have characteristics such as small particle size, desirable dispensability and stability, the materials may enter the nano-scale pores and cracks and cooperate with microscopic plugging materials to produce a synergistic effect, thereby achieve an effective plugging, increase the loading capacity of the stratum, and maintain stability of the well wall. However, the existing nanometer plugging material may have less variety, and may be prone to cause an agglomeration, which results in an increased particle size and affects the overall performance of the drilling fluid.

The shale gas resources have broad prospects, huge development potential and economic & social value, a large-scale development of the shale gas resources is conducive to safeguarding national energy security. Therefore, it is desirable to prepare a novel nanometer plugging agent and a strong plugging low-pollution water-based drilling fluid, which is suitable for drilling boreholes in deep well large displacement horizontal segment shale stratum, and has important practical significance for maintaining stability of well wall, improving the drilling operation efficiency of shale gas horizontal well and reducing occurrence of complex borehole conditions.

In a first aspect, the present disclosure provides a strong plugging drilling fluid composition. in accordance with some embodiments, the strong plugging drilling fluid composition comprises water, bentonite, $Na_2CO_3$, a shale inhibitor, a filtrate reducer, a viscosity reducer, an anti-collapse agent, a nanometer plugging agent, a lubricant and a weighting agent. The shale inhibitor is modified asphalt, the anti-collapse agent is ultra-fine calcium carbonate, and the nanometer plugging agent is polyethylene glycol surface-modified nano-graphene.

In some embodiments, the shale inhibitor has a particle diameter distribution in a range of 1-100 μm, preferably a range of 10-25 μm.

In some embodiments, the anti-collapse agent has a particle diameter distribution in a range of 1-25 μm, preferably a range of 2-5 μm.

In some embodiments, the bentonite is contained in an amount of 2-6 parts by weight, the $Na_2CO_3$ is contained in an amount of 0.1-1 parts by weight, the shale inhibitor is contained in an amount of 1-10 parts by weight, the filtrate reducer is contained in an amount of 1-10 parts by weight, the viscosity reducer is contained in an amount of 0.1-6 parts by weight, the anti-collapse agent is contained in an amount of 1-15 parts by weight, the nanometer plugging agent is contained in an amount of 0.1-5 parts by weight, the lubricant is contained in an amount of 0.5-5 parts by weight, the weighting agent is contained in an amount of 90-130 parts by weight, based on 100 parts by weight of water.

In some embodiments, the components are interacted by strictly controlling the content of each component, such that the prepared drilling fluid composition may exert the optimal effect during the drilling process, thereby allow the prepared drilling fluid to effectively plug the micrometer/nanometer cracks in the shale deep well large displacement horizontal segment well wall, prevent the collapse of well wall, falling and instability of blocks, and maintain stability of the well wall with desirable application effects.

In some embodiments, the effects are good when the content of the bentonite is 2-4 parts by weight, the content of $Na_2CO_3$ is 0.1-0.5 parts by weight, the content of the shale inhibitor is 1-5 parts by weight, the content of the filtrate reducer is 2.5-5 parts by weight, the content of viscosity reducer is 0.2-1.5 parts by weight, the content of the anti-collapse agent is 2-10 parts by weight, the content of the nanometer plugging agent is 0.1-3 parts by weight, the content of lubricant is 1-4.5 parts by weight, the content of the weighting agent is 90-120 parts by weight, based on 100 parts by weight of water.

In some embodiments, the effects are preferable when the content of the bentonite is 3 parts by weight, the content of $Na_2CO_3$ is 0.1-0.2 parts by weight, the content of the shale inhibitor is 3-4 parts by weight, the content of the filtrate reducer is 3-4.5 parts by weight, the content of viscosity reducer is 0.5-1 parts by weight, the content of the anti-collapse agent is 3-7 parts by weight, the content of the nanometer plugging agent is 0.5-1.5 parts by weight, the content of lubricant is 2-4 parts by weight, the content of the weighting agent is 105-109 parts by weight, based on 100 parts by weight of water.

In some embodiments, the shale inhibitor may be a modified asphalt, wherein the modified asphalt may also be referred to as a low-fluorescence modified asphalt anti-collapse agent for drilling fluid. The asphalt may be modified with a fluorescent agent, a polymer, or a combination thereof. The modified asphalt is used in the drilling fluid to plug the micro-cracks in the stratum, and prevent the exfoliated shale from collapsing. It has sound lubrication and anti-collapse effects, and has the functions of resisting high temperature and reducing filtrate loss. The modified asphalt imposes an unique effect on inhibiting hydration and expansion of the mud shale, and can be directly applied in a variety of water-based drilling fluid systems so as to reduce the filtrate loss and prevent collapse of the well wall. In addition, the modified asphalt does display no or low fluorescence but exhibits a high resistivity, thus it is conducive to acquire the comprehensive and accurate electrical measurement of geological data from the exploratory well. Moreover, the modified asphalt has stable performance, the process of preparing slurry is simple, and the operation is convenient without pollution. The modified asphalt, for example, GLA, can be commercially available, which is a dark brown free-flowing powder. The drying loss is ≤15%, the pH is within a range of 9.0-11.0, and the API filtrate loss of the base slurry (with an additional amount of 2%) is ≤12.0 mL. The high-temperature and high pressure (HTHP) filtrate loss of the base slurry (with an additional amount of 2%) is ≤25.0 mL, the relative expansion reduction rate of the base slurry (3% sample solution) is ≥35.0%, and the fluorescence level is ≤5.0.

In some embodiments, the filtrate reducer may be a sulfonated methyl phenolic resin(e.g., SMP-3 as described below), wherein the sulfonated methyl phenolic resin SMP-3 is the powdery sulfonated product prepared by spray drying a colloid product obtained through polymerization and sulfonation of the phenol, formaldehyde and sulphonate for several times under a certain condition. It is a water-soluble irregular linear super-polymer in the form of a reddish brown powder, its molecular structure contains a benzene ring, a methylene bridge and a C—S bond, it is an high temperature resistant filtrate reducer with strong thermal stability. The sulfonated methyl phenolic resin SMP-3 can be commercially available. The sulfonated methyl phenolic resin is a powder, wherein the dry basis mass fraction is ≥90%, the water insoluble matter is ≤5%, the cloud point salinity (calculated based on Cl⁻) is ≥170 g/L, the extinction value is ≤0.6%, the apparent viscosity is ≤45 mPa·s, the high temperature and high pressure filtrate loss is ≤30 ml, and the foaming rate is ≤10%.

In some embodiments, the viscosity reducer may be a zwitterionic polymer (e.g., XY-27 as described herein) which is low molecular weight polymeric viscosity reducer obtained by carrying out polymerization based on a monomer containing —COONa, —CONH$_2$, —SO$_3$Na and —NR$^{4+}$ groups. The viscosity reducer is a white or faint yellow powder, has both an organic cationic group and an anionic group on the polymer molecular chain. The introduction of organic cationic groups enhances the adsorption strength and adsorption rate of the zwitterionic polymer on the clay surface and neutralizing the surface charge of the clay, thus it has strong inhibitive capability. The presence of a large number of anionic groups improves the viscosity reduction effect of the zwitterionic polymer. The pH value is within a range of 5-8, the apparent viscosity is ≤15 mpa·s, the apparent viscosity after hot rolling at a temperature of 160° C. is ≤27 mpa·s, the viscosity reduction rate is ≥70%, the anti-saturation salt temperature resistance is ≤200, thus it exhibits the excellent properties of high temperature resistance and salt resistance. In the invention, the zwitterionic polymer can be commercially available powder, the water content is ≤10%, water insoluble matter is ≤5%, the residue on sieve of 0.9 mm pore size is ≤10%, the apparent viscosity of the aqueous solution with a concentration of 10% is ≤15.0 mPa·s, the viscosity reduction rate is ≥70%, and the apparent viscosity after hot rolling at a temperature of 160° C. is ≤27.56 mPa·s.

In some embodiments, the anti-collapse agent may be ultra-fine calcium carbonate (e.g., C80 as described herein), the ultra-fine calcium carbonate may be prepared from the following process: calcinating raw materials such as limestone to form lime (its main component is calcium oxide) and carbon dioxide, and then adding water to dissolve the lime to form lime milk (its main component is calcium hydroxide), subsequently introducing carbon dioxide to carbonize lime milk thereby form calcium carbonate precipitate, which is finally dehydrated, dried and pulverized by a lime mill; or subjecting the sodium carbonate and calcium chloride to the double decomposition reaction to produce calcium carbonate precipitate, which is dehydrated, dried and pulverized, it is an anti-collapse agent. The anti-collapse agent ultrafine calcium carbonate (e.g., C80) can be commercially available. It is a white solid without taste and odor, it has a relative density of 2.71 g/cm$^3$, and it is decomposed into calcium oxide and carbon dioxide at a high temperature about 825° C., the melting point is 1339° C., the melting point under a pressure of 10.7 MPa is 1289° C.; the ultra-fine calcium carbonate C80 is difficult to dissolve in water and alcohol; it reacts with dilute acid in an exothermic reaction and releases carbon dioxide at the same time, it is soluble in an ammonium chloride solution, but it is almost insoluble in water.

In some embodiments, the lubricant may be graphite. The graphite is produced by using a natural flake graphite as the raw material and subjecting it to a milling device, wherein the micro-powder graphite lubricant (e.g., HS0 as described below) has a carbon content ranging from 95.0-99.95%, the particle diameter distribution of D10 is within a range of 1.3-2.3 μm, the particle diameter distribution of D50 is within a range of 4-6 μm, and the particle diameter distribution of D90 is within a range of 7-10 μm.

In some embodiments, the weighting agent may be barite, wherein the barite is ultrafine barium sulfate having a particle diameter of 325 mesh, a specific gravity of 4.3 g/cm$^3$, and a whiteness of 85.

In some embodiments, the preparation method of the nanometer plugging agent comprises the following steps:
(1) dispersing nano-graphene in a solvent to obtain a dispersion liquid;
(2) dispersing polyethylene glycol in the dispersion liquid for performing surface modification;
(3) washing, separating and drying the product obtained in step (2).

In some embodiments, the nanometer plugging agent has a particle size distribution ranging from 30-80 nm, preferably 40-75 nm, more preferably 43.5-69.7 nm. In addition, the nanometer plugging agent prepared by the invention has high strength and does not exhibit biological toxicity, and it is mainly used for filling the pore and crack space between the large particles, and meets the requirements of the environmentally-friendly drilling fluid treatment agent. In addition, it shall be noted that in the present disclosure the particle diameter distribution can be comprehended as a distribution interval of the average particle diameter.

The nano-plugging agent in the present disclosure has excellent water stability and may effectively prevent agglomeration between the nanoparticles. When the drilling process encounters the micrometer/nanometer cracks in the shale stratum, the modified asphalt with larger particle size initially constructs bridges, reduces the size of the cracks, then the micron-sized ultra-fine calcium carbonate with smaller particle diameter fills to reduce the size of the shale cracks till the blocking process is finished by using the last stage of nanometer plugging agent, thereby effectively plug a variety of micrometer/nanometer pores and cracks of the well wall. The different anti-collapse agents and treatment agents can form a "force chain network" at the micro-scale contact interface through reasonable compounding and particle diameter grading, such that the particles are squeezed and tightly coupled with each other, thereby improve the sealing capability of the strong plugging drilling fluid composition and reduce the possibility of collapse and falling of the blocks during the drilling process.

In some embodiments, the solvent in step (1) may be water and/or absolute ethanol; preferably, the solvent is deionized water.

Preferably, the nano-graphene may be used in an amount of 0.05-5 g, preferably 0.5-3 g, relative to 100 mL of the solvent.

In some embodiments, the surface modification conditions in step (2) comprise: the temperature may be within a range of 60-80° C., the stirring rate may range from 500-900 r/min, and the time may be 3-5 hours; it is preferably that the dispersion is performed under the magnetic stirring conditions, wherein the magnetic stirring rate may be within a range of 700-900 r/min.

The polyethylene glycol may be used in an amount of 1-5 g, preferably 2-4 g, relative to 100 mL of the solvent.

In some embodiments, the separation conditions in step (3) include: the rotational speed of the separation is from 3,000 r/min to 5,000 r/min; the drying conditions comprise: the temperature is within a range of 50-80° C., and the time is 6-12 h.

In a second aspect, the present disclosure provides a method for preparing the aforementioned drilling fluid composition, comprising:
(S1) performing pre-hydration treatment of the bentonite;
(S2) mixing the bentonite obtained following the pre-hydration treatment in step (S1) with the shale inhibitor, the filtrate reducer, the viscosity reducer, the anti-collapse agent, the nanometer plugging agent, the lubricant and the weighting agent sequentially.

In some embodiments, the bentonite is calcium bentonite, and the method of pre-hydrating the bentonite comprises: taking a certain amount of water, adding it with an amount 6% of bentonite, and mixing it with an amount 5% of sodium carbonate ($Na_2CO_3$) based on the quantity of bentonite, stirring the mixture for 30 minutes, and standing still for 24 h to convert the calcium bentonite into the sodium bentonite, that is, the sodium carbonate is used during the pre-hydration process.

In a third aspect, the present disclosure provides a use of method for simulating the plugging of deep well large displacement horizontal segment shale stratum, wherein the aforementioned drilling fluid composition or a drilling fluid composition prepared with the aforementioned preparation method in drilling a deep well large displacement horizontal segment shale stratum.

As compared with the existing shale drilling fluid system in use, the long horizontal segment drilling fluid for drilling shale provided in the present disclosure has the following advantages:

(1) A variety of plugging materials with different particle sizes squeezed and tightly coupled with each other, thereby form a "force chain network" at the micro-scale interface, and effectively improves the plugging capacity of the drilling fluid system;

(2) the drilling fluid system uses a low-fluorescence treatment agent to minimize the interference to the well logging work as far as possible;

(3) the drilling fluid system has sound rheological properties and strong rock carrying capacity;

(4) the nanometer plugging agent has desirable water stability and uniform particle diameter distribution;

(5) the flexible material modified asphalt and the rigid material ultra-fine calcium carbonate in the plugging materials of the drilling fluid perform synergistic effect with the nanometer plugging agent, and the plugging effect is desirable.

The invention will be described in detail below by means of examples.

In the following examples and comparative examples:
an electronic balance with accuracy 0.0001 g is purchased from Shanghai Tianping Instrument Factory in China;
the Bentonite may be Xinjiang bentonite with a brand name "Xiazijie", which is purchased from Xinjiang Nonmetallic Minerals Xiazijie Bentonite Co., Ltd in northwest China;
$Na_2CO_3$ may be sodium carbonate purchased from Chengdu Kelon Chemical Reagent Factory in Sichuan Province of southwest China;
the shale inhibitor modified asphalt may be purchased from Henan Jianjie Industrial Co., Ltd. in central China, the model number is GLA;
the filtrate reducer sulfonated methyl phenolic resin may be purchased from Sichuan Zhengrong Industrial Co., Ltd. in southwest China, the model number is SMP-3;
the viscosity reducer zwitterionic polymer may be purchased from Zhengzhou Yuhua Auxiliary Co., Ltd. in Henan Province of central China, the model number is XY-27;
the anti-collapse agent ultra-fine calcium carbonate may be purchased from Henan Coral Environmental Protection Technology Co., Ltd. in central China, the model number is C80;
the nano-graphene may be purchased from Beijing Dk Nano technology Co., Ltd. in China, the model number is CNT900;
the polyethylene glycol may be purchased from Foshan Dezhong Chemical Technology Co., Ltd. in Guangdong Province of south China, the model number is PEG-600;
The lubricant graphite may be purchased from Qingdao Yanhai Carbon Materials Co., Ltd. in Shandong Province of eastern China, model is HS0;

the weighting agent barite may be purchased from Shijiazhuang Xinbo Mineral Products Co., Ltd. in Heibei Province of north China, the model number is ultra-fine barium sulfate.

Preparation Example 1

The Preparation Example serves to illustrate the preparation method of the nanometer plugging agent of the invention.

1 g of nano-graphene material was poured into 100 mL of water and was stirred at a high speed under a magnetic stirring rate of 900 r/min; after the nano-graphene was dispersed uniformly, 3 g of polyethylene glycol was added into the graphene solution under the conditions comprising a temperature of 60° C. and a magnetic stirring rate of 900 r/min, the stirring was continuously performed for 3 h to carry out the surface modification, the mixed solution was washed with water for 3 times, and was centrifuged at a rotational speed of 3,000 r/min, and was dried at a temperature of 60° C. for 8 h, thereby produced a nanometer plugging agent.

As a result, the prepared nanometer plugging agent is composed of black powdery particles, which are insoluble in water and have an average particle diameter of 43.5 nm.

Preparation Example 2

The Preparation Example serves to illustrate the preparation method of the nanometer plugging agent of the invention.

2 g of nano-graphene material was poured into 100 mL of water and was stirred at a high speed under a magnetic stirring rate of 800 r/min; after the nano-graphene was dispersed uniformly, 4 g of polyethylene glycol was added into the graphene solution under the conditions comprising a temperature of 70° C. and a magnetic stirring rate of 900 r/min, the stirring was continuously performed for 4 h to carry out the surface modification, the mixed solution was washed with water for 4 times, and was centrifuged at a rotational speed of 4,000 r/min, and was dried at a temperature of 70° C. for 10 h, thereby produced a nanometer plugging agent.

As a result, the prepared nanometer plugging agent is composed of black powdery particles, which are insoluble in water and have an average particle diameter of 57.6 nm.

Preparation Example 3

The Preparation Example serves to illustrate the preparation method of the nanometer plugging agent of the invention.

3 g of nano-graphene material was poured into 100 mL of water and was stirred at a high speed under a magnetic stirring rate of 700 r/min; after the nano-graphene was dispersed uniformly, 5 g of polyethylene glycol was added into the graphene solution under the conditions comprising a temperature of 80° C. and a magnetic stirring rate of 900 r/min, the stirring was continuously performed for 5 h to carry out the surface modification, the mixed solution was washed with water for 5 times, and was centrifuged at a rotational speed of 5,000 r/min, and was dried at a temperature of 80° C. for 12 h, thereby produced a nanometer plugging agent.

As a result, the prepared nanometer plugging agent is composed of black powdery particles, which are insoluble in water and have an average particle diameter of 69.7 nm.

Example 1

The example aims to illustrate a strong plugging drilling fluid suitable for drilling a deep well large displacement horizontal segment shale stratum and a method for preparing the same in the invention.

Measuring 100 parts by weight of water and heating its temperature to 70° C.; adding 3 parts by weight of bentonite under an electric stirring with a low speed 700 r/min, adding 0.10 parts by weight of $Na_2CO_3$ after stirring for 15 min, and further stirring the mixture for 30 min, standing still the mixture at an ambient temperature for 24 h so as to perform a pre-hydration treatment; adding 3.0 parts by weight of shale inhibitor modified asphalt GLA under an electric stirring with a low speed 600 r/min and blending for 15 min, then adding 3 parts by weight of filtrate reducer SMP-3 and stirring for 10 min, further adding 0.2 parts by weight of viscosity reducer XY-27 and blending for 10 min, adding 3 parts by weight of anti-collapse agent ultra-fine calcium carbonate C80 and stirring for 15 min, subsequently adding 0.5 parts by weight of the nanometer plugging agent prepared in the Preparation Example 1 and blending for 15 minutes, adding 2 parts by weight of lubricant graphite and stirring for 10 min, and finally adding 105 parts by weight of weighting agent barite and blending the mixture for 15 minutes, thereby prepare the drilling solution.

Wherein the average particle diameter of the modified asphalt GLA is 15.23 jam; the average particle diameter of the ultrafine calcium carbonate C80 is 2.4 µm; and the average particle diameter of the nanometer plugging agent prepared in the Preparation Example 1 is 43.5 nm.

The test results of the high temperature and high pressure (HTHP) filtrate loss of the drilling fluid are shown in Table 1. The performance test results of plugging the shale microcracks are as shown in Table 2.

Example 2

The example aims to illustrate a strong plugging drilling fluid suitable for drilling a deep well large displacement horizontal segment shale stratum and a method for preparing the same in the invention.

Measuring 100 parts by weight of water and heating its temperature to 70° C.; adding 3 parts by weight of bentonite under an electric stirring with a low speed 700 r/min, adding 0.15 parts by weight of $Na_2CO_3$ after stirring for 15 min, and further stirring the mixture for 30 min, standing still the mixture at an ambient temperature for 24 h so as to perform a pre-hydration treatment; adding 3.5 parts by weight of shale inhibitor modified asphalt GLA under an electric stirring with a low speed 600 r/min and blending for 15 min, then adding 3.75 parts by weight of filtrate reducer SMP-3 and stirring for 10 min, further adding 0.35 parts by weight of viscosity reducer XY-27 and blending for 10 min, adding 5.0 parts by weight of anti-collapse agent ultra-fine calcium carbonate C80 and stirring for 15 min, subsequently adding 1.0 parts by weight of the nanometer plugging agent prepared in the Preparation Example 1 and blending for 15 minutes, adding 3.0 parts by weight of lubricant graphite and stirring for 10 min, and finally adding 107 parts by weight of weighting agent barite and blending the mixture for 15 minutes, thereby prepare the drilling solution.

Wherein the average particle diameter of the modified asphalt GLA is 15.23 jam; the average particle diameter of the ultrafine calcium carbonate C80 is 2.4 µm; and the average particle diameter of the nanometer plugging agent prepared in the Preparation Example 1 is 43.5 nm.

The test results of the high temperature and high pressure (HTHP) filtrate loss of the drilling fluid are shown in Table 1. The performance test results of plugging the shale microcracks are as shown in Table 2.

Example 3

The example aims to illustrate a strong plugging drilling fluid suitable for drilling a deep well large displacement horizontal segment shale stratum and a method for preparing the same in the invention.

Measuring 100 parts by weight of water and heating its temperature to 70° C.; adding 3 parts by weight of bentonite under an electric stirring with a low speed 700 r/min, adding 0.20 parts by weight of $Na_2CO_3$ after stirring for 15 min, and further stirring the mixture for 30 min, standing still the mixture at an ambient temperature for 24 h so as to perform a pre-hydration treatment; adding 4.0 parts by weight of shale inhibitor modified asphalt GLA under an electric stirring with a low speed 600 r/min and blending for 15 min, then adding 4.5 parts by weight of filtrate reducer SMP-3 and stirring for 10 min, further adding 0.5 parts by weight of viscosity reducer XY-27 and blending for 10 min, adding 7 parts by weight of anti-collapse agent ultra-fine calcium carbonate C80 and stirring for 15 min, subsequently adding 1.5 parts by weight of the nanometer plugging agent prepared in the Preparation Example 1 and blending for 15 minutes, adding 4 parts by weight of lubricant graphite and stirring for 10 min, and finally adding 109 parts by weight of weighting agent barite and blending the mixture for 15 minutes, thereby prepare the drilling solution.

Wherein the average particle diameter of the modified asphalt GLA is 15.23 jam; the average particle diameter of the ultrafine calcium carbonate C80 is 2.4 µm; and the average particle diameter of the nanometer plugging agent prepared in the Preparation Example 1 is 43.5 nm.

The test results of the high temperature and high pressure (HTHP) filtrate loss of the drilling fluid are shown in Table 1. The performance test results of plugging the shale microcracks are as shown in Table 2.

Example 4

The example aims to illustrate a strong plugging drilling fluid suitable for drilling a deep well large displacement horizontal segment shale stratum and a method for preparing the same in the invention.

Measuring 100 parts by weight of water and heating its temperature to 70° C.; adding 3 parts by weight of bentonite under an electric stirring with a low speed 700 r/min, adding 0.15 parts by weight of $Na_2CO_3$ after stirring for 15 min, and further stirring the mixture for 30 min, standing still the mixture at an ambient temperature for 24 h so as to perform a pre-hydration treatment; adding 2.0 parts by weight of shale inhibitor modified asphalt GLA under an electric stirring with a low speed 600 r/min and blending for 15 min, then adding 2.5 parts by weight of filtrate reducer SMP-3 and blending for 10 min, further adding 0.1 parts by weight of viscosity reducer XY-27 and stirring for 10 min, adding 2.5 parts by weight of anti-collapse agent ultra-fine calcium carbonate C80 and stirring for 15 min, subsequently adding 0.3 parts by weight of the nanometer plugging agent prepared in the Preparation Example 1 and blending for 15 minutes, adding 1.5 parts by weight of lubricant graphite and stirring for 10 min, and finally adding 103 parts by weight of weighting agent barite and blending the mixture for 15 minutes, thereby prepare the drilling solution.

Wherein the average particle diameter of the modified asphalt GLA is 15.23 jam; the average particle diameter of the ultrafine calcium carbonate C80 is 2.4 μm; and the average particle diameter of the nanometer plugging agent prepared in the Preparation Example 1 is 43.5 nm.

The test results of the high temperature and high pressure (HTHP) filtrate loss of the drilling fluid are shown in Table 1. The performance test results of plugging the shale microcracks are as shown in Table 2.

Example 5

The example aims to illustrate a strong plugging drilling fluid suitable for drilling a deep well large displacement horizontal segment shale stratum and a method for preparing the same in the invention.

Measuring 100 parts by weight of water and heating its temperature to 70° C.; adding 3 parts by weight of bentonite under an electric stirring with a low speed 700 r/min, adding 0.15 parts by weight of $Na_2CO_3$ after stirring for 15 min, and further stirring the mixture for 30 min, standing still the mixture at an ambient temperature for 24 h so as to perform a pre-hydration treatment; adding 5 parts by weight of shale inhibitor modified asphalt GLA under an electric stirring with a low speed 600 r/min and blending for 15 min, then adding 5 parts by weight of filtrate reducer SMP-3 and stirring for 10 min, further adding 0.8 parts by weight of viscosity reducer XY-27 and blending for 10 min, adding 7.5 parts by weight of anti-collapse agent ultra-fine calcium carbonate C80 and stirring for 15 min, subsequently adding 2.0 parts by weight of the nanometer plugging agent prepared in the Preparation Example 1 and blending for 15 minutes, adding 4.5 parts by weight of lubricant graphite and stirring for 10 min, and finally adding 111 parts by weight of weighting agent barite and blending the mixture for 15 minutes, thereby prepare the drilling solution.

Wherein the average particle diameter of the modified asphalt GLA is 15.23 jam; the average particle diameter of the ultrafine calcium carbonate C80 is 2.4 μm; and the average particle diameter of the nanometer plugging agent prepared in the Preparation Example 1 is 43.5 nm.

The test results of the high temperature and high pressure (HTHP) filtrate loss of the drilling fluid are shown in Table 1. The performance test results of plugging the shale microcracks are as shown in Table 2.

Example 6

A drilling fluid was prepared with the same method as in Example 1, except for the following difference: the nanometer plugging agent used in the Example 1 was replaced by 0.5 parts by weight of the nanometer plugging agent prepared in the Preparation Example 2.

The test results of the high temperature and high pressure (HTHP) filtrate loss of the drilling fluid are shown in Table 1. The performance test results of plugging the shale microcracks are as shown in Table 2.

Example 7

A drilling fluid was prepared with the same method as in Example 2, except for the following difference: the nanometer plugging agent used in the Example 2 was replaced by 1.0 parts by weight of the nanometer plugging agent prepared in the Preparation Example 2.

The test results of the high temperature and high pressure (HTHP) filtrate loss of the drilling fluid are shown in Table 1. The performance test results of plugging the shale microcracks are as shown in Table 2.

Example 8

A drilling fluid was prepared with the same method as in Example 3, except for the following difference: the nanometer plugging agent used in the Example 3 was replaced by 1.5 parts by weight of the nanometer plugging agent prepared in the Preparation Example 2.

The test results of the high temperature and high pressure (HTHP) filtrate loss of the drilling fluid are shown in Table 1. The performance test results of plugging the shale microcracks are as shown in Table 2.

Example 9

A drilling fluid was prepared with the same method as in Example 4, except for the following difference: the nanometer plugging agent used in the Example 4 was replaced by 0.3 parts by weight of the nanometer plugging agent prepared in the Preparation Example 2.

The test results of the high temperature and high pressure (HTHP) filtrate loss of the drilling fluid are shown in Table 1. The performance test results of plugging the shale microcracks are as shown in Table 2.

Example 10

A drilling fluid was prepared with the same method as in Example 5, except for the following difference: the nanometer plugging agent used in the Example 5 was replaced by 2.0 parts by weight of the nanometer plugging agent prepared in the Preparation Example 2.

The test results of the high temperature and high pressure (HTHP) filtrate loss of the drilling fluid are shown in Table 1. The performance test results of plugging the shale microcracks are as shown in Table 2.

Example 11

A drilling fluid was prepared with the same method as in Example 1, except for the following difference: the nanometer plugging agent used in the Example 1 was replaced by 0.5 parts by weight of the nanometer plugging agent prepared in the Preparation Example 3.

The test results of the high temperature and high pressure (HTHP) filtrate loss of the drilling fluid are shown in Table 1. The performance test results of plugging the shale microcracks are as shown in Table 2.

Example 12

A drilling fluid was prepared with the same method as in Example 2, except for the following difference: the nanometer plugging agent used in the Example 2 was replaced by 1.0 parts by weight of the nanometer plugging agent prepared in the Preparation Example 3.

The test results of the high temperature and high pressure (HTHP) filtrate loss of the drilling fluid are shown in Table 1. The performance test results of plugging the shale microcracks are as shown in Table 2.

Example 13

A drilling fluid was prepared with the same method as in Example 3, except for the following difference: the nanometer plugging agent used in the Example 3 was replaced by 1.5 parts by weight of the nanometer plugging agent prepared in the Preparation Example 3.

The test results of the high temperature and high pressure (HTHP) filtrate loss of the drilling fluid are shown in Table 1. The performance test results of plugging the shale microcracks are as shown in Table 2.

Example 14

A drilling fluid was prepared with the same method as in Example 4, except for the following difference: the nanometer plugging agent used in the Example 4 was replaced by 0.3 parts by weight of the nanometer plugging agent prepared in the Preparation Example 3.

The test results of the high temperature and high pressure (HTHP) filtrate loss of the drilling fluid are shown in Table 1. The performance test results of plugging the shale microcracks are as shown in Table 2.

Example 15

A drilling fluid was prepared with the same method as in Example 5, except for the following difference: the nanometer plugging agent used in the Example 5 was replaced by 2.0 parts by weight of the nanometer plugging agent prepared in the Preparation Example 3.

The test results of the high temperature and high pressure (HTHP) filtrate loss of the drilling fluid are shown in Table 1. The performance test results of plugging the shale microcracks are as shown in Table 2.

Comparative Example 1

A drilling fluid was prepared with the same method as in Example 2, except for the following difference: the added amount of nanometer plugging agent was 0 parts by weight.

The test results of the high temperature and high pressure (HTHP) filtrate loss of the drilling fluid are shown in Table 1. The performance test results of plugging the shale microcracks are as shown in Table 2.

Comparative Example 2

A drilling fluid was prepared with the same method as in Example 2, except for the following difference: the added amount of shale inhibitor modified asphalt GLA was 0 parts by weight.

The test results of the high temperature and high pressure (HTHP) filtrate loss of the drilling fluid are shown in Table 1. The performance test results of plugging the shale microcracks are as shown in Table 2.

Comparative Example 3

A drilling fluid was prepared with the same method as in Example 2, except for the following difference: the added amount of anti-collapse agent ultra-fine calcium carbonate C80 was 0 parts by weight.

The test results of the high temperature and high pressure (HTHP) filtrate loss of the drilling fluid are shown in Table 1. The performance test results of plugging the shale microcracks are as shown in Table 2.

Comparative Example 4

A drilling fluid was prepared with the same method as in Example 2, except for the following difference: the added amount of the nanometer plugging agent and shale inhibitor modified asphalt GLA was 0 parts by weight.

The test results of the high temperature and high pressure (HTHP) filtrate loss of the drilling fluid are shown in Table 1. The performance test results of plugging the shale microcracks are as shown in Table 2.

Comparative Example 5

A drilling fluid was prepared with the same method as in Example 2, except for the following differences: the modified asphalt GLA in use has an average particle diameter of 375.85 μm; the ultrafine calcium carbonate C80 has an average particle diameter of 205.72 μm; and the nanometer plugging agent prepared by the Preparation Example 1 is used, while the average particle size of the nanometer plugging agent is 353.52 nm.

The test results of the high temperature and high pressure (HTHP) filtrate loss of the drilling fluid are shown in Table 1. The performance test results of plugging the shale microcracks are as shown in Table 2.

Comparative Example 6

A drilling fluid was prepared with the same method as in Example 6, except for the following differences: the modified asphalt GLA in use has an average particle diameter of 232.48 μm; the ultrafine calcium carbonate C80 has an average particle diameter of 128.73 μm; and the nanometer plugging agent prepared by the Preparation Example 2 is used, but the average particle size of the nanometer plugging agent is 276.82 nm.

The test results of the high temperature and high pressure (HTHP) filtrate loss of the drilling fluid are shown in Table 1. The performance test results of plugging the shale microcracks are as shown in Table 2.

Comparative Example 7

A drilling fluid was prepared with the same method as in Example 11, except for the following differences: the modified asphalt GLA in use has an average particle diameter of 125.82 μm; the ultrafine calcium carbonate C80 has an average particle diameter of 53.49 μm; and the nanometer plugging agent prepared by the Preparation Example 3 is used, while the average particle size of the nanometer plugging agent is 200.34 nm.

The test results of the high temperature and high pressure (HTHP) filtrate loss of the drilling fluid are shown in Table 1. The performance test results of plugging the shale microcracks are as shown in Table 2.

Comparative Example 8

A drilling fluid was prepared with the same method as in Example 2, except for the following difference: the added amount of nanometer plugging agent in the Preparation Example 1 was 10 parts by weight.

The test results of the high temperature and high pressure (HTHP) filtrate loss of the drilling fluid are shown in Table 1. The performance test results of plugging the shale microcracks are as shown in Table 2.

Comparative Example 9

A drilling fluid was prepared with the same method as in Example 2, except for the following difference: the added amount of nanometer plugging agent in the Preparation Example 2 was 10 parts by weight.

The test results of the high temperature and high pressure (HTHP) filtrate loss of the drilling fluid are shown in Table 1. The performance test results of plugging the shale microcracks are as shown in Table 2.

Comparative Example 10

A drilling fluid was prepared with the same method as in Example 2, except for the following difference: the added amount of nanometer plugging agent in the Preparation Example 3 was 10 parts by weight.

The test results of the high temperature and high pressure (HTHP) filtrate loss of the drilling fluid are shown in Table 1. The performance test results of plugging the shale microcracks are as shown in Table 2.

Comparative Example 11

A drilling fluid was prepared with the same method as in Example 2, except for the following difference: the particle diameter of nanometer plugging agent is 212.3 μm.

The test results of the high temperature and high pressure (HTHP) filtrate loss of the drilling fluid are shown in Table 1. The performance test results of plugging the shale microcracks are as shown in Table 2.

Test Example 1

The appropriate amounts of drilling fluid prepared in Examples 1-15 and Comparative Examples 1-11 were used for test, the high temperature and high pressure (HTHP) filtrate loss of the drilling fluid was tested by using a high temperature and high pressure filter press, and the thickness of the mud cake was measured to reflect the filtrate loss of the drilling fluid and the mass of formed mud cake. The test results are as shown in Table 1.

TABLE 1

| Number | Density (g/cm$^3$) | Thickness of mud cake (mm) | Filtrate loss (mL) |
|---|---|---|---|
| Example 1 | 1.20 | 3.5 | 10.6 |
| Example 2 | 1.27 | 3.0 | 10.0 |
| Example 3 | 1.34 | 3.5 | 10.8 |
| Example 4 | 1.15 | 3.8 | 11.2 |
| Example 5 | 1.39 | 4.0 | 11.6 |
| Example 6 | 1.20 | 3.7 | 11.4 |
| Example 7 | 1.27 | 3.3 | 10.0 |
| Example 8 | 1.34 | 3.8 | 11.4 |
| Example 9 | 1.15 | 4.2 | 12.0 |
| Example 10 | 1.39 | 4.3 | 12.2 |
| Example 11 | 1.20 | 3.6 | 11.6 |
| Example 12 | 1.27 | 3.2 | 11.0 |
| Example 13 | 1.34 | 3.9 | 11.8 |
| Example 14 | 1.15 | 4.3 | 12.4 |
| Example 15 | 1.39 | 4.2 | 12.4 |
| Comparative Example 1 | 1.26 | 4.5 | 13.0 |
| Comparative Example 2 | 1.24 | 4.8 | 13.4 |
| Comparative Example 3 | 1.22 | 5.0 | 13.6 |
| Comparative Example 4 | 1.23 | 5.3 | 13.8 |
| Comparative Example 5 | 1.21 | 5.8 | 14.2 |
| Comparative Example 6 | 1.19 | 6.0 | 15.0 |
| Comparative Example 7 | 1.18 | 6.5 | 15.2 |
| Comparative Example 8 | 1.36 | 6.5 | 12.8 |
| Comparative Example 9 | 1.36 | 6.8 | 13.0 |
| Comparative Example 10 | 1.36 | 6.8 | 13.2 |
| Comparative Example 11 | 1.27 | 4.9 | 13.6 |

The analysis derived from data in Table 1 may be as follows:

(1) The high temperature and high pressure filtrate loss of the drilling fluids in Examples 1-15 ranges from 10.0-12.4 ml, and the thickness of mud cake is within a range of 3.0-4.3 mm, it demonstrates that when the drilling process encounters the micrometer/nanometer cracks in the shale stratum, the modified asphalt GLA with larger particle size initially constructs bridges, reduces the size of the cracks, then the micron-sized ultra-fine calcium carbonate C80 with smaller particle diameter fills to reduce the size of the shale cracks till the blocking process is finished by using the last stage of nanometer plugging agent, thereby effectively plug the variety of micrometer/nanometer pores and cracks of the well wall; in addition, each of the drilling fluids prepared within the proper definition scopes of composition and content has excellent performance of constructing well wall with filtrate loss, and can form thin and dense mud cake on the well wall, thereby reduce invasion of the solid phase and liquid phase of the drilling fluid into the stratus and damage to the reservoir.

(2) Compared with the properties of drilling fluids in Examples 1-15, each of the high temperature and high pressure filtrate losses of the drilling solutions of the Comparative Examples 1-7 exceeds 13.0 ml, the maximum filtrate loss is 15.2 ml; each of the thickness of mud cakes exceeds 4.5 mm, the maximum thickness of mud cake is 6.8 mm, it demonstrate that the unreasonable compounding of contents of the shale inhibitor, anti-collapse agent and nanometer plugging agent in the drilling fluid as well as the unreasonable granular composition of the particle sizes impose a negative influence on the synergistic plugging effect of the particles and the performance of constructing well wall with filtrate loss of the drilling fluid as a whole. In addition, it illustrates that during a process of constructing well wall with filtrate loss of the drilling fluid, the particles of the shale inhibitor modified asphalt GLA, the anti-collapse agent ultra-fine calcium carbonate C80 and the nanometer plugging agent are mutually squeezed, closely coupled and alternately performing the blocking functions through reasonable compounding and particle size grading, so as to form a denser and tougher mud cake, thereby effectively reduce the intrusion of drilling fluid in liquid phase to the shale micrometer/nanometer cracks.

(3) As compared with the performance of the drilling fluid in Examples 1-15, each of the high temperature and high pressure filtrate losses of the drilling solution in Comparative Examples 8-10 is greater than 12.8 ml, the maximum filtrate loss is 13.2 ml; each thickness of the mud cakes is more than 6.5 mm, and the maximum thickness of mud cake reaches 6.8 mm. It indicates that the excessive nanometer plugging agent may impose a negative impact on properties of the drilling fluid, and it also demonstrates that the drilling fluid prepared within the defined content range has favorable properties.

(4) When compared with the drilling fluid performance of Examples 1-15, the high temperature and high pressure fluid loss of the drilling fluid of Comparative Example 11 is 13.6 ml, and the thickness of mud cake is 4.9 mm, it indicates that the nanometer plugging agent with larger particle size has a negative impact on properties of the drilling fluid, and it also demonstrates that the drilling fluid prepared within the defined content range shows favorable properties.

To sum up, a strong plugging drilling fluid suitable for drilling deep well large displacement horizontal segment shale stratum in the invention may show desirable properties of constructing well wall with filtrate loss and may form a thin and dense mud cake by mean of the synergistic effect of the rigid plugging material and flexible material having different particle diameters, thereby effectively plugging the shale micrometer/nanometer cracks and preventing the penetration of the drilling fluid filtrate into the permeable pores and cracks.

Test Example 2

500 cm$^3$ of the drilling fluids prepared in Examples 1-15 and Comparative Examples 1-11 were taken separately for measurement, a visible sand bed filter press was used, 150 cm$^3$ of 75 mesh quartz sand, 100 cm$^3$ of 200 mesh quartz sand, and 100 cm$^3$ 1,000 mesh quartz sand were mixed evenly, the mixture was poured into a cylindrical transparent drilling fluid cup to simulate the shale heterogeneous stratus with pores and cracks, then 500 cm$^3$ of prepared drilling fluid was poured into the cup, the cup cover is tightened, a gas source with a pressure adjusted to 0.69 MPa was connected to the cup, an air valve was opened to allow the gas source enter into the drilling fluid cup, so as to simulate the state that the drilling fluid is squeezed into the well wall in the borehole, and observe and record the intrusion depth of drilling fluid through the cup body. The test results are shown in Table 2.

TABLE 2

| Number | Intrusion depth (cm) at 7.5 min | Intrusion depth (cm) at 30 min |
|---|---|---|
| Example 1 | 2.8 | 4.2 |
| Example 2 | 2.3 | 3.8 |
| Example 3 | 2.5 | 4.0 |
| Example 4 | 3.4 | 5.0 |
| Example 5 | 3.8 | 5.0 |
| Example 6 | 3.0 | 4.8 |
| Example 7 | 2.7 | 4.4 |
| Example 8 | 3.2 | 4.8 |
| Example 9 | 4.0 | 5.6 |
| Example 10 | 4.4 | 6.0 |
| Example 11 | 4.0 | 5.4 |
| Example 12 | 3.8 | 5.6 |
| Example 13 | 4.2 | 5.6 |
| Example 14 | 4.6 | 5.8 |
| Example 15 | 4.8 | 6.0 |
| Comparative Example 1 | 5.6 | 6.8 |
| Comparative Example 2 | 6.2 | 7.6 |
| Comparative Example 3 | 6.4 | 7.8 |
| Comparative Example 4 | 6.8 | 7.2 |
| Comparative Example 5 | 7.0 | 8.4 |
| Comparative Example 6 | 8.2 | 9.6 |
| Comparative Example 7 | 7.8 | 9.2 |
| Comparative Example 8 | 7.4 | 9.0 |
| Comparative Example 9 | 6.8 | 8.4 |
| Comparative Example 10 | 7.0 | 8.6 |
| Comparative Example 11 | 7.6 | 9.4 |

The analysis derived from data in Table 1 may be as follows:
(1) The intrusion depth of the drilling fluid at 7.5 min in Examples 1-15 is within a range of 2.3-4.8 cm, and the intrusion depth of the drilling fluid at 30 min is within a range of 3.8-6.0 cm, it demonstrates that the unreasonable compounding of contents of the shale inhibitor, anti-collapse agent and nanometer plugging agent in the drilling fluid as well as the unreasonable granular composition of the particle sizes impose a negative influence on the synergistic plugging effect of the particles and the generation of "force chain network" at the micro-scale contact interface. In addition, it indicates that the three rigid and flexible plugging materials with different particle diameters in the prepared drilling fluid within the suitable definition scopes of composition and content may act synergistically to create a "force chain network" at the micro-scale contact interface, thereby producing the desirable plugging properties on the shale micrometer/nanometer pores and cracks.

(2) Compared with the properties of the drilling fluids in Examples 1-15, the intrusion depth of the drilling fluid at 7.5 min in each of the Comparative Examples 1-7 is greater than 5.6 cm, and the maximum intrusion depth reaches 8.2 cm; the intrusion depth of the drilling fluid at 30 min in each of the Comparative Examples 1-7 exceeds 6.8 cm, and the maximum intrusion depth reaches 9.6 cm, it demonstrates that during the synergistic plugging process, the particles of the shale inhibitor modified asphalt GLA, the anti-collapse agent ultra-fine calcium carbonate C80 and the nanometer plugging agent are mutually squeezed, closely coupled and alternately performing the blocking functions through reasonable compounding and particle size grading, so as to form a stronger "force chain network", thereby effectively reduce the intrusion depth of the drilling fluid into the shale micrometer/nanometer pores and cracks.

(3) As compared with the properties of the drilling fluids in Examples 1-15, the intrusion depth of the drilling fluid at 7.5 min in each of the Comparative Examples 8-15 is greater than 6.8 cm, and the maximum intrusion depth reaches 7.4 cm; the intrusion depth of the drilling fluid at 30 min in each of the Comparative Examples 8-15 exceeds 8.4 cm, and the maximum intrusion depth reaches 9.0 cm, it indicates that the excessive nanometer plugging agent may impose a negative impact on properties of the drilling fluid, and it also demonstrates that the drilling fluid prepared within the defined content range has favorable properties.

(4) When compared with the drilling fluid performance of Examples 1-15, the intrusion depth of the drilling fluid at 7.5 min in the Comparative Example 11 is 7.6 cm, and the intrusion depth of the drilling fluid at 30 min in the Comparative Example 11 is 9.4 cm, it indicates that the nanometer plugging agent with larger particle size has a negative impact on properties of the drilling fluid, and it also demonstrates that the drilling fluid prepared within the defined content range shows favorable properties.

In summary, the present disclosure provides a strong plugging drilling fluid which is suitable for drilling a deep well large displacement horizontal segment shale stratum, wherein the particles are mutually squeezed, closely coupled and alternately performing the blocking functions through reasonable compounding and particle size grading, so as to form a stronger "force chain network", thereby effectively reduce the intrusion depth of the drilling fluid into the shale micrometer/nanometer pores and cracks, and generate the desirable plugging capability.

While the invention is described above in detail in some preferred embodiments, the invention is not limited to those embodiments. Various simple variations, including combinations of the technical features in any other appropriate way, can be made to the technical scheme of the invention within the scope of the technical concept of the invention, but such variations and combinations shall be deemed as disclosed content in the invention and falling in the protection scope of the invention.

The invention claimed is:
1. A plugging drilling fluid composition, comprising water, bentonite, Na$_2$CO$_3$, a shale inhibitor, a filtrate reducer, a viscosity reducer, an anti-collapse agent, a nanometer plugging agent, a lubricant and a weighting agent, wherein the shale inhibitor is modified asphalt, the anti-collapse agent is calcium carbonate, and the nanometer plugging agent is polyethylene glycol surface-modified nano-graphene, wherein the bentonite is contained in an amount of 2-6 parts by weight, the $Na_2CO_3$ is contained in an amount of 0.1-1 parts by weight, the shale inhibitor is contained in an amount of 1-10 parts by weight, the filtrate reducer is contained in an amount of 1-10 parts by weight, the viscosity reducer is contained in an amount of 0.1-6 parts by weight, the anti-collapse agent is contained in an amount of 1-15 parts by weight, the nanometer plugging agent is contained in an amount of 0.1-5 parts by weight, the lubricant is contained in an amount of 0.5-5 parts by weight, the weighting agent is contained in an amount of 90-130 parts by weight, based on 100 parts by weight of water.

2. The drilling fluid composition according to claim 1, wherein the shale inhibitor has a particle diameter distribution in a range of 1-100 μm; the anti-collapse agent has a particle diameter distribution in a range of 1-25 μm; the nanometer plugging agent has a particle diameter distribution in a range of 1-150 nm.

3. The drilling fluid composition according to claim 2, wherein the shale inhibitor has a particle diameter distribution in a range of 10-25 μm.

4. The drilling fluid composition according to claim 2, wherein the anti-collapse agent has a particle diameter distribution in a range of 2-5 μm.

5. The drilling fluid composition according to claim 2, wherein the nanometer plugging agent has a particle diameter distribution in a range of 30-80 nm.

6. The drilling fluid composition according to claim 1, wherein the filtrate reducer is sulfonated methyl phenolic resin, the viscosity reducer is a zwitterionic polymer, the lubricant is graphite, and the weighting agent is barite.

7. The drilling fluid composition according to claim 1, wherein the nanometer plugging agent is prepared using a method comprising steps of:
(1) dispersing nano-graphene in a solvent to obtain a dispersion liquid;
(2) dispersing polyethylene glycol in the dispersion liquid for performing surface modification;
(3) washing, separating and drying the product obtained in step (2).

8. The drilling fluid composition according to claim 7, wherein the solvent in step (1) is water and/or absolute ethanol.

9. The drilling fluid composition according to claim 7, wherein the nano-graphene is used in an amount of 0.05-5 g relative to 100 mL of the solvent.

10. The drilling fluid composition according to claim 7, wherein the surface modification conditions in step (2) comprise: the temperature is within a range of 60-80° C., the stirring rate ranges from 500-900 r/min, and the time is 3-5 hours.

11. The drilling fluid composition according to claim 7, wherein the polyethylene glycol is used in an amount of 1-5 g relative to 100 mL of the solvent.

12. The drilling fluid composition according to claim 7, wherein the separation conditions in step (3) include: the rotational speed of the separation is 3,000 r/min-5,000 r/min; the drying conditions comprise: the temperature is within a range of 50-80° C., and the time is 6-12 h.

13. A method for preparing the drilling fluid composition according to claim 1, comprising:
(S1) performing pre-hydration treatment of the bentonite;
(S2) mixing the bentonite obtained following the pre-hydration treatment in step (S1) with the shale inhibitor, the filtrate reducer, the viscosity reducer, the anti-collapse agent, the nanometer plugging agent, the lubricant and the weighting agent sequentially.

14. A method of use for simulating the plugging of horizontal segment shale stratum, characterized in that the drilling fluid composition according to claim 1 is used in the simulation process of drilling horizontal segment shale stratum.

15. The method according to claim 14, wherein the horizontal segment shale stratum comprises 150 $cm^3$ of 75 mesh quartz sand, 100 $cm^3$ of 200 mesh quartz sand, and 100 $cm^3$ of 1,000 mesh quartz sand.

16. The method according to claim 14, wherein a pressure is 0.65-0.7 MPa relative to the 500 $cm^3$ drilling fluid composition.

* * * * *